United States Patent [19]

Azar et al.

[11] Patent Number: 5,021,871
[45] Date of Patent: Jun. 4, 1991

[54] CONVERSION CIRCUIT FOR REMOVING LINE-BY-LINE PHASE ALTERNATION

[76] Inventors: Charles Azar, 3773 Matheson Ave., Miami, Fla. 33133; Fernando V. Rabelo, 8000 W. Drive, Apt. 322, Miami, Fla. 33141

[21] Appl. No.: 243,259

[22] Filed: Sep. 12, 1988

[51] Int. Cl.$^5$ ............................................. H04N 11/20
[52] U.S. Cl. ......................................... 358/11; 358/40
[58] Field of Search ..................... 358/11, 19, 21 R, 40

[56] References Cited

U.S. PATENT DOCUMENTS 3,562,413  2/1971  Coleman, Jr. ..................... 358/19

FOREIGN PATENT DOCUMENTS 0281696 12/1986 Japan .

OTHER PUBLICATIONS

Carnt et al., "Colour Television" Iliffe Book Ltd., 1969, pp. 241-267.

Primary Examiner—Howard W. Britton
Assistant Examiner—David E. Harvey
Attorney, Agent, or Firm—Eckert Seamans Cherin & Mellott

[57] ABSTRACT

The present invention includes a delay line for memorizing the chrominance composite signal for one horizontal time period of a phase alternating input signal and a switch alternatingly applying a first phase composite signal for one line and then the delayed first phase composite signal (from the output of the delay line) at its output based upon the application of the control signal. In one embodiment, the control signal is obtained by detecting the phase of the phase alternating signal, and more specifically by detecting the phase of the color burst. This is accomplished by first isolating the color burst signal by a switch triggered by the burst gate pulse, then passing the color burst to a phase discriminator to determine whether the phase alternating composite signal for a give line is in phase or out-of-phase with a reference signal. The output of the phase discriminator is applied to the set input of a flip-flop. The flip-flop is clocked by the horizontal sync signal and the output of the flip-flop controls the switch outputting an unalternating phase signal as either a first phase of the phase alternating signal or a delayed first phase signal thereof. The invention can be incorporated in an appratus for converting phase-alternating-line (PAL) signals to unalternating phase signals for processing on equipment adapted to handle NTSC signals.

7 Claims, 3 Drawing Sheets

CONVERSION CIRCUIT FOR REMOVING LINE-BY-LINE PHASE ALTERNATION

BACKGROUND OF THE INVENTION

1. Field of the Invention

The present invention relates to a conversion circuit that eliminates the undesirable phase shift of the R-Y (or "V") chrominance component relative to the B-Y (or "U") chrominance component of a phase-alternating line format video signal, as characteristic of a PAL video signal, by replacing the signal on every other line with the signal from the previous line, to thereby generate a chrominance signal with R-Y and B-Y axes referenced at unalternating phase, as in an NTSC (National Television System Committee) chrominance composite signal.

2. Prior Art

NTSC television or video signals include a horizontal sync pulse followed by a color burst which in turn is followed by a chrominance/luminance signal in each scanning line. The chrominance and luminance signal contains the information for displaying a color picture. NTSC signals include 525 lines per frame, which is composed of two fields. There are 60 fields per second. The NTSC signal has quadrature modulated chrominance referenced to a phase as defined by the burst.

The PAL composite signal also has quadrature modulated chrominance, however one axis (R-Y or "V") is inverted on alternating lines. Hence the term "phase alternating line" signals. Additionally, PAL signals have 625 lines per frame and 50 fields per second or 25 frames per second.

The NTSC standard was the first color television system and was originally introduced in the United States. Generally, it is used in the U.S., Japan, Canada and Mexico. The PAL system was developed in Europe and is generally used in the United Kingdom, Australia and some other European countries. Video tapes made using phase alternating chrominance signals cannot be played by VCRs (video cassette recorders/players) and shown on displays capable of decoding only unalternating phase signals, unless the foregoing difference in line-by-line axis inversion is resolved.

OBJECTS OF THE PRESENT INVENTION

It is an object of the present invention to provide a simple conversion circuit for generating an unalternating phase chrominance composite signal from an alternating phase chrominance composite signal.

It is a further object of the present invention to provide a conversion circuit that is inexpensive when compared with other prior art circuits.

It is an additional object of the present invention to provide a conversion circuit that is stable, not affected by interference, and constantly corrects its phase.

SUMMARY OF THE INVENTION

The present invention includes a delay line for memorizing the phase alternating chrominance composite signal for one horizontal time period (i.e., referenced to a first of the two alternating phases) and a switch alternately applying the first phase composite signal for one line, and then repeating the delayed first phase composite signal (from the output of the delay line) at its output for the next line, switching back and forth based upon the application of the control signal. In one embodiment, the control signal is obtained by detecting the phase of the alternating-phase signal, and more specifically by detecting the phase of the color burst. This is accomplished by first isolating the color burst signal by a switch triggered by the burst gate pulse, then passing the color burst to a phase discriminator to determine whether the composite signal for the particular line is in phase or out-of-phase with a reference signal. The output of the phase discriminator is applied to the set input of a flip-flop. The flip-flop is clocked by the horizontal sync signal and the output of the flip-flop controls the switch outputting an unalternating-phase signal, namely either a line of the first phase signal or a delayed line of the first phase signal, for each line of the output signal.

BRIEF DESCRIPTION OF THE DRAWINGS

Further objects and advantages of the present invention can be found in the detailed description of the preferred embodiments when taken in conjunction with the accompanying drawings in which.

DETAILED DESCRIPTION OF PREFERRED EMBODIMENTS

The present invention relates to a conversion circuit for generating an unalternating phase chrominance composite signal from a line-by-line alternating chrominance composite signal.

By way of background, the present conversion circuit is incorporated into a VCR that is generally converted to play a PAL video tape. The head drum speed of the VCR is changed since the PAL tape is made at 50 hertz field rate whereas NTSC video tapes are made at 60 hertz field rate. The signal's chrominance component must be obtained from signals originating on the PAL tape. The retrieval of the PAL chrominance composite signal is known to persons of ordinary skill in the art.

Figure 1:
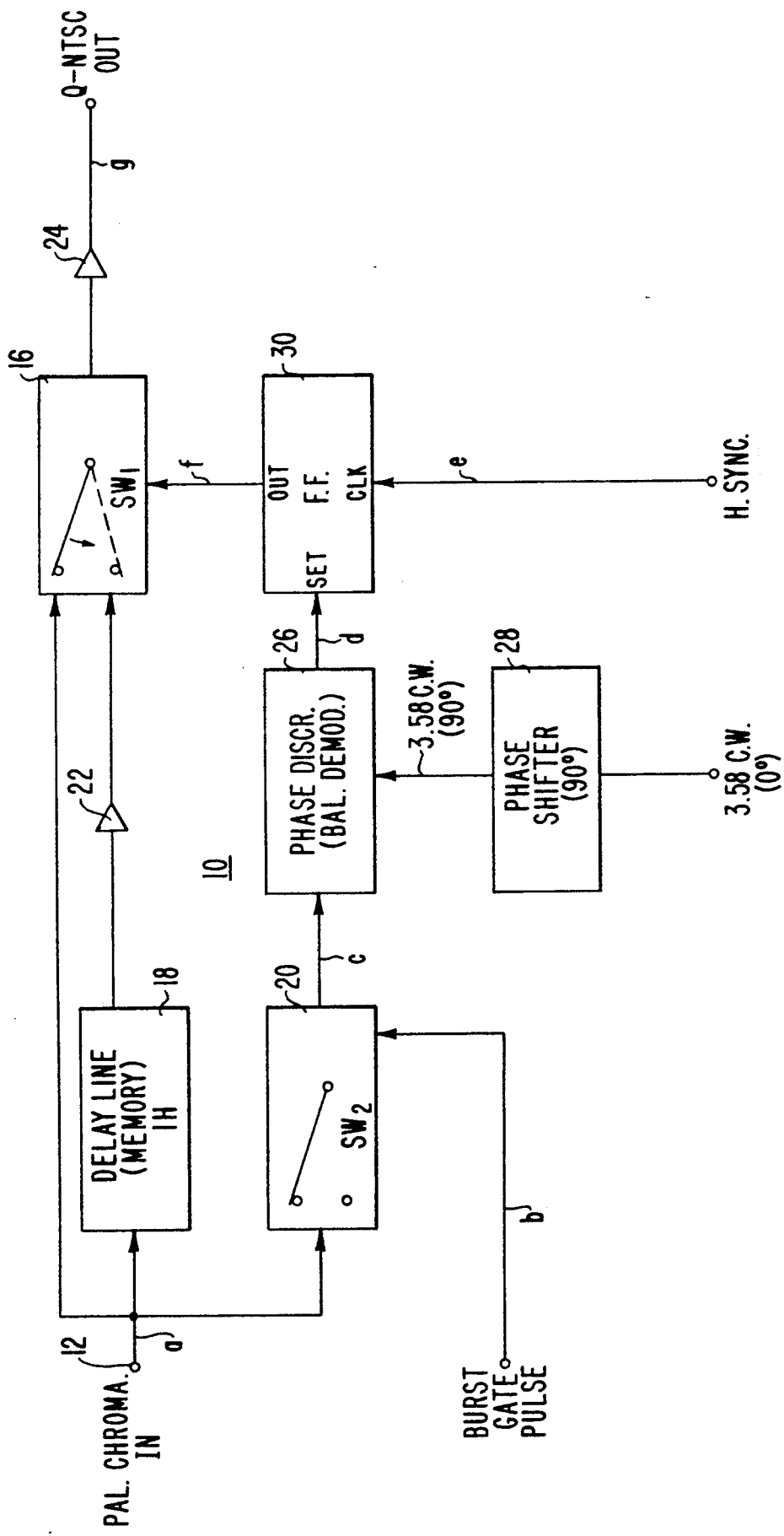
FIG. 1 illustrates a first embodiment of the present invention.
Figure 2:
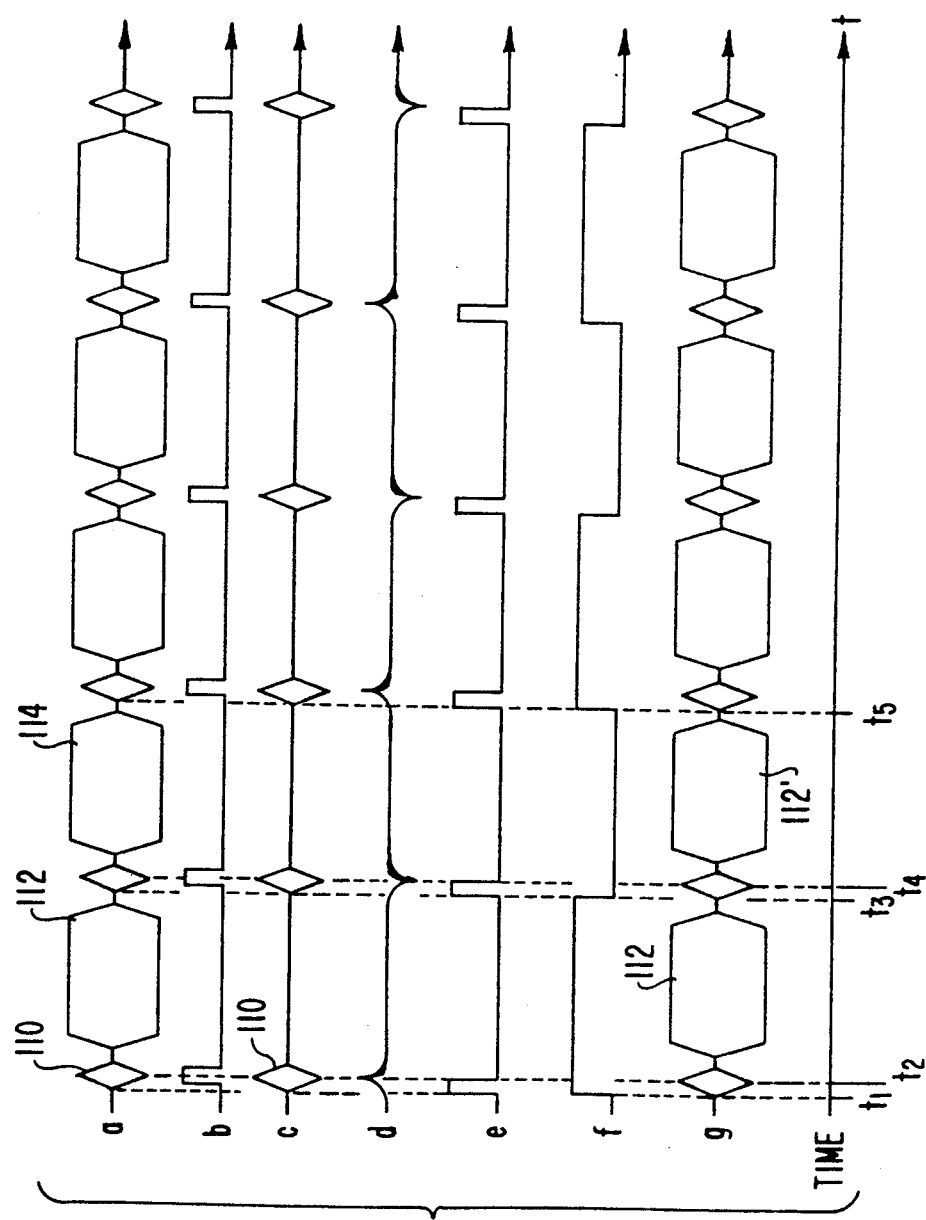
FIG. 2 illustrates a timing diagram for the signals in the conversion circuit.

FIG. 1 illustrates conversion circuit 10 having a line-by-line alternating chrominance composite signal input at terminal 12. FIG. 2 schematically illustrates the signal a at terminal 12, which is the alternating phase chrominance composite signal. As used herein, the term "chrominance composite signal" includes the signal generally from time $t_1$ to $t_3$ shown in FIG. 2. That signal includes a color burst 110 representing a reference, and a chrominance component 112 at a phase angle representing hue. The signal also contains a luminance component; however, that component is not discussed herein. As shown herein, for example, it is assumed that the component 112 produces a solid "red" screen. The line scan extends from time $t_1$ through time $t_3$. The second line also includes a color burst and a chrominance component 114. There is a phase difference between first line chrominance component 112 and next line chrominance component 114 of the alternating phase signal, even though both represent the same hue.

Figure 3A:
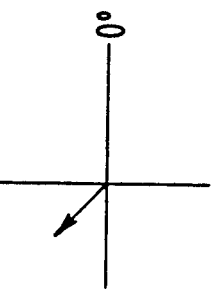
FIG. 3A and 3B illustrate phase relationships of the chrominance component and burst of the alternating phase chrominance signal.
Figure 3B:
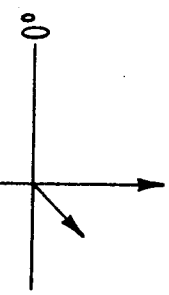

As shown in FIG. 3A, which is the phase diagram for the color difference signal R-Y, the phase of the first line is 90 degrees. The burst vector is at 135 degrees. In contrast, FIG. 3B shows the second line chrominance component of the alternating phase signal, having a phase at 270 degrees and a burst vector at 225 degrees. The next line scan beginning at time $t_5$ would have a phase similar to that shown in FIG. 3A. To process the signal on equipment expecting an unalternating phase (as in NTSC), the chrominance signal would have the same phase for all the lines.

Returning to FIG. 1, the alternating phase chrominance composite signal is applied to a switch 16 ($SW_1$), a delay line 18, and a switch 20 ($SW_2$). Switch $SW_1$ is controlled by a signal f that will be described later. Delay line 18 is a glass type delay line that memorizes one scan line or one complete horizontal time period of the alternating phase chrominance signal. Therefore, switch $SW_1$ is switched between a first phase chrominance signal and a delayed first phase chrominance signal, depending upon the application of the proper control signal. The second phase chrominance signal does not pass through to the output of switch $SW_1$ due to the switching action of that switch. Between the output of delay line 18 and switch $SW_1$ is an amplifier 22. This amplifier corrects for losses in that signal path. The output of switch $SW_1$ is also amplified by amplifier 24. The output of switch $SW_1$ is shown as signal g and is referenced to an unalternating phase because the second phase line of the alternating phase signal is dropped by switch $SW_1$ and in its place is supplied a delayed first phase signal, namely the chrominance of the previous line. Signal g is shown in FIG. 2. The first phase signal of the alternating phase input is chrominance portion 112 in signal a. The same signal appears in signal g due to the positioning of switch $SW_1$. However, in the second time period spanning $t_3$ through $t_5$, a delayed first phase signal identified as 112' is inserted in the place of the second phase signal 114 present in input signal a. Hence, the unalternating phase output signal does not include each line of the alternating phase input signal but only includes every other line. However, due to the relatively large number of lines, the lack of color difference between each line, and the fast appearance of these lines on the video monitor or television screen, there is no significant deterioration of the display.

The present system should be contrasted to other systems that completely decode the alternating phase signal, and re-encode the signal to generate a true chrominance composite signal at unalternating phase. Costly demodulators and synchronizers are not utilized in the present invention and, accordingly, the cost of the present system is less than that of prior art systems. Also, due to the absence of such demodulator, the signal deteriorates less in this new system.

FIG. 1 shows the preferred embodiment for generating control signal f applied to switch $SW_1$ Switch $SW_2$ is designed to isolate color burst 110, that is, signal c in FIG. 2. This isolation is accomplished by applying the burst gate pulse, signal b in FIG. 2, to the control input of switch $SW_2$. Color burst 110, signal c, is applied to phase discriminator 26. The phase discriminator is a balanced demodulator that is synchronized to the 3.58 MHz carrier wave. The 3.58 MHz carrier wave set at, for example, 0 degrees phase, is applied to phase shifter 28. The phase shifter shifts the phase of the carrier wave 90 degrees and the modified wave is applied to the balanced demodulator or phase discriminator 26. The 0 degree phase carrier wave is simply a reference to the value of the first phase of the alternating phase chrominance signal. The output of phase discriminator 26 is signal d shown in FIG. 2. That signal alternates between positive going and negative going pulses as shown between times $t_1-t_2$ and $t_3-t_4$. Signal d is applied to the set input of flip-flop 30. Flip-flop 30 is a bistable switch. Horizontal sync signal e is applied to the clock input of flip-flop 30. The horizontal sync signal precedes the color burst signal in the overall video composite signal. The horizontal signal clocks the flip-flop and the output of the flop-flop is a control signal f, shown in FIG. 2. Therefore, between times $t_1$ and $t_3$, control signal f is high due to the clock pulse of the horizontal sync signal and the phase indicator signal d. At the leading edge of the horizontal sync signal at time $t_3$, the flip-flop changes states and the output goes low. This change of state causes switch $SW_1$ to switch between the undelayed first phase chrominance composite signal and the delayed first phase chrominance composite signal. Of course, the phase indicator signal d could be applied to the not-set input such that the correct control signal is generated at the flip-flop's output.

The conversion circuit detects the first phase of an alternating two phase signal and generates a control signal f that effects a means for outputting an undelayed chrominance signal upon application of a control signal and for outputting a delayed chrominance signal in the absence of the control signal.

Alternatively, the control section of the converter circuit may generate first and second respective control signals which are the high and low sections in signal f. The high control signal is generated for the first phase of the alternating phase signal whereas the low control signal is generated for the second phase of the alternating phase signal.

Figure 4:
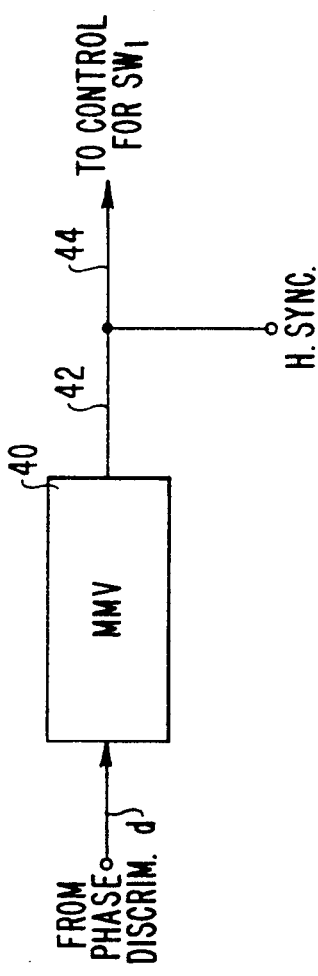
FIG. 4 illustrates a second embodiment for generating a control signal for switch $SW_1$ in FIG. 1.
Figure 5:
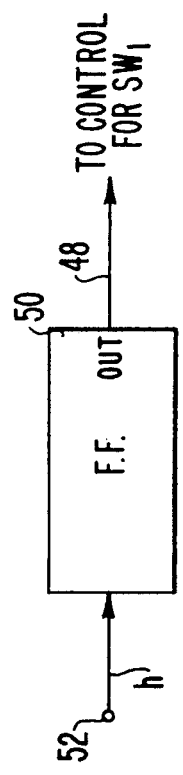
FIG. 5 illustrates a further embodiment for generating the control signal for that switch.
Figure 6:
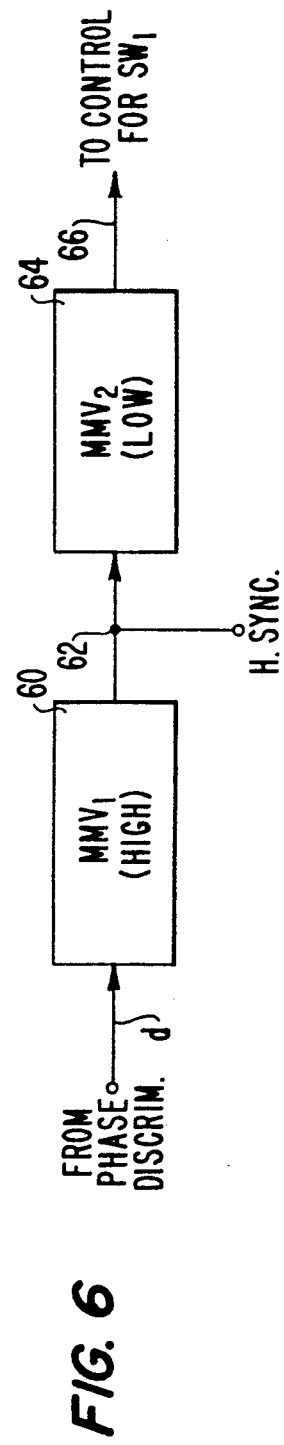
FIG. 6 illustrates an additional embodiment for generating the control signal for switch $SW_1$ in FIG. 1.

FIGS. 4, 5 and 6 show alternate embodiments for generating control signal f. In FIG. 4, flip-flop 30 is replaced with monostable multivibrator (MMV) 40. MMV 40 produces a timed output. Hence the signal on line 42 goes high for a predetermined period of time. This period of time could be set at approximately one horizontal scan period. The horizontal sync signal is added to the output on line 42 such that when the horizontal sync signal is high, the leading edge of the control signal applied on line 44 appears at time $t_1$. However, if MMV 40 is set for one horizontal period, the falling edge of the control signal would occur at time $t_4$. Therefore, MMV 40 should be set slightly less than the horizontal time period.

FIG. 5 shows a further embodiment to generate a control signal on line 48. Flip-flop 50 is applied a signal h at input 52. Flip-flop 50 is simply toggled high and low based upon a pulse appearing at input 52. Therefore, signal h can be the burst gate pulse b, the output of the phase discriminator d (assuming that flip-flop 50 recognizes positive as well as negative going pulses), or can be the horizontal sync signal e. However, the use of flip-flop, without additional components to generate the control signal, may pose a problem in that any interference in the video signal can cause the flip-flop to change state and the video display will change from displaying the first phase signal and delayed first phase signal to displaying the second phase signal and a delayed second phase signal.

FIG. 6 shows a further circuit for generating the control signal. Signal d, which is shown in FIG. 2 and is output from phase discriminator 26, is applied to monostable multivibrator MMV$_1$ (item 60). The horizontal sync signal is added to the output of MMV$_1$ at summing point 62, and that summed signal is applied to a second MMV 64 (MMV$_2$) MMV$_1$ is timed to go high for one horizontal period; the horizontal sync signal adds a portion to the control signal to the leading edge; MMV$_2$ is timed to go low at a predetermined timing interval. Therefore, the output of MMV$_2$ is set to go low precisely at one horizontal scan period after it senses the leading edge of the horizontal sync signal. The output on line 66 is applied to the control of switch SW$_1$ in FIG. 1.

Assuming that the device is used as part of an apparatus for converting a PAL-generated signal for display on NTSC type equipment, there are some other concerns regarding PAL signals. For example, the PAL signal has 625 lines whereas the NTSC signal has 525 lines. This does not present a problem since the raster usually overscans the screen such that the edge portions are not visible. However, this is a minor problem in the viewing of the PAL type signals on NTSC type television equipment.

The claims appended hereto are meant to cover modifications and changes within the scope and spirit of the present invention.

We claim:

1. A circuit for converting phase alternating chrominance composite signals to unalternating chrominance composite signals, comprising:
   means for detecting a first phase of two phase, phase alternating line signals and for generating a control signal based thereon;
   means for delaying a chrominance signal associated with said first phase for a predetermined horizontal time period;
   means for outputting an undelayed chrominance signal upon application of said control signal and for outputting said chrominance signal delayed by said predetermined horizontal time period, in the absence of said control signal, whereby chrominance information for one line referenced to said first phase is substituted for chrominance information for a second line, referenced to the other said phase.

2. A circuit as claimed in claim 1 wherein said means for delaying delays all phase alternating chrominance composite signals and wherein the first and second lines include two consecutive phase alternating chrominance composite signals each having a first and second phase, and two consecutive lines of information output as said unalternating chrominance composite signals consist of repeated first lines, having first phase, of said consecutive phase alternating chrominance composite signals.

3. A circuit as claimed in claim 2 wherein said means for detecting includes a phase discriminator and means for generating said control signal for said predetermined horizontal time period when said phase discriminator detects a predetermined phase of said phase alternating chrominance composite signals.

4. A circuit as claimed in claim 3 wherein said means for generating said control signal is a bistable switch having a clock input to which is applied a horizontal sync signal of said phase alternating chrominance composite signals.

5. A circuit as claimed in claim 3 wherein said means for generating said control signal is means for producing an output signal over a predetermined interval of time when said phase discriminator detects said predetermined phase of said phase alternating chrominance composite signals.

6. A circuit as claimed in claim 3 including means for separating out a color burst signal from said phase alternating chrominance composite signals and for applying said color burst signals to said phase discriminator.

7. A circuit for converting chrominance portions of phase alternating composite signals to single phase composite signals comprising:
   means for generating first and second respective control signals for first and second alternating phases of said phase alternating composite signals;
   means for delaying at least said first phase of said phase alternating composite signal for a predetermined horizontal time period to obtain a delayed first phase of said phase alternating composite signal;
   means for outputting an undelayed first phase composite signal upon application of said first control signal and for outputting said delayed first phase composite signal upon application of said second control signal, thereby providing a composite signal having a single phase.

* * * * *